United States Patent [19]

Beaman

[11] Patent Number: 4,605,975
[45] Date of Patent: Aug. 12, 1986

[54] PORTABLE NEWS-GATHERING CASSETTE RECORDER HAVING MICROPHONE TALK-OVER CAPABILITY

[76] Inventor: Franklin D. Beaman, 835 Forest Ave., Wilmette, Ill. 60091

[21] Appl. No.: 507,971

[22] Filed: Jun. 27, 1983

[51] Int. Cl.[4] .............................................. G11B 15/12
[52] U.S. Cl. ....................................... 360/62; 360/61; 179/6.2
[58] Field of Search ................... 179/6.01, 6.2; 360/61, 360/62; 369/2, 3, 4

[56] References Cited

U.S. PATENT DOCUMENTS

| | | | |
|---|---|---|---|
| 3,373,508 | 3/1968 | Holden et al. | 360/61 |
| 3,930,266 | 12/1975 | Okamoto | 360/62 |
| 4,340,915 | 7/1982 | Nakamura et al. | 360/61 |
| 4,395,739 | 7/1983 | Nakazawa et al. | 360/61 |

OTHER PUBLICATIONS

Telephone with Built in Cassette Recorder, Popular Electronics, vol. 20, No. 4, 4/82, p. 10.

Primary Examiner—Raymond F. Cardillo
Assistant Examiner—Hoa T. Nguyen
Attorney, Agent, or Firm—McDougall, Hersh & Scott

[57] ABSTRACT

A portable tape recorder for remote location news-gathering including a rugged metal housing having operating controls and input-output connections located at one end for ease of access. An audio output suitable for direct interconnection to telephone circuitry is provided in addition to internal speaker and external headset audio output connections. A talk-over preamp operatively interconnects the microphone or other audio input to the recorder output when the recorder is in the pause mode facilitating the use of the recorder microphone for direct telephone line connection. This permits live reporter commentaries, introductions, or 'wrap-arounds' to be conveniently interspersed with pre-recorded news story segments. The speaker audio output is muted in the talk-over mode to preclude acoustic feedback while reporter 'side-tone' monitoring is available through the external headset or telephone handset connections.

2 Claims, 2 Drawing Figures

PORTABLE NEWS-GATHERING CASSETTE RECORDER HAVING MICROPHONE TALK-OVER CAPABILITY

The present invention relates to portable audo tape equipment and, in particular, to a light-weight, battery-operated cassette recorder specially suited for use in broadcast news-gathering and news reporting.

In the pursuit of a news story, a reporter must often travel to the scene of the news event in order to directly question or conduct interviews with witnesses and other knowledgeable or newsworthy persons. Such interviews are preferably recorded to facilitate subsequent replay over the broadcast media, although the reporter may alternatively elect to paraphrase or otherwise compose his own description of the event. In either case, it is generally desirable to record all or portions of the story and then to rapidly forward the account directly over telephone circuits to the appropriate broadcast newsroom. Thus, the present invention provides, in addition to the conventional speaker/headphone playback output, an output connection of suitable level for direct connection to telephone handsets thereby avoiding the poor fidelity and high ambient noise inherent when utilizing indirect speaker-to-microphone acoustic coupling.

When directly connecting a recorder to a telephone, it is both customary and necessary to remove the mouthpiece of the telephone handset to facilitate connection to the contacts thereunder and, importantly, to reduce the undesired background noise picked up by the telephone microphone which would otherwise degrade the quality of the recorded news story. Although conventional recorders may be modified for direct connection to telephone circuits in this manner, removal of the telephone mouthpiece renders live voice communication over the telephone equipment impossible. By contrast, the instant news-gathering cassette recorder includes an audio talk-over capability wherein the live audio from the recorder connected microphone may be fed directly to the telephone line through the recorder output connection. This feature permits the newsman to converse with broadcast station personnel without interruption and to rapidly transition between the recorded and live story segments. In this manner, the news reporter may introduce or 'wrap-up' recorded news segments without perceptible interruption when transitioning between these two formats.

A further advantage of the recorder microphone talk-over feature of the instant invention is the fidelity obtainable wherein the high quality recorder microphone is utilized both for the recorded interview segments and for the live news reporter commentary or 'wrap-around'. Thus, reliance on low quality telephone carbon microphone cartridges, notorious for low speech quality, is avoided.

The instant recorder is further provided with speech processing circuitry tailored to the news-gathering environment. First, the audio frequency response is restricted to the range between about 200 Hz and 7,000 Hz. Frequencies above 7,000 Hz, generally within the audio passband of conventional recorders, are not present to any extent in the human voice and, therefore, are not required for faithful voice reproduction. Filtering of these frequencies minimizes undesirable tape noise and hiss thereby improving overall reproduction quality. Similarly, filtering of the low frequencies below 200 Hz eliminates distracting rumble and hum often encountered in remote news-gathering environments further improving the reproduction quality as compared to conventional cassette recorders. Automatic record level control is provided to enhance volume uniformity for widely varying voice characteristics.

FIG. 1 is a perspective view of the portable news-gathering recorder of the present invention; and FIG. 2 is a block representation of the audio circuitry of the present invention including the pause bypass preamp and output speaker muting.

DESCRIPTION OF THE PREFERRED EMBODIMENT

Figure 1:
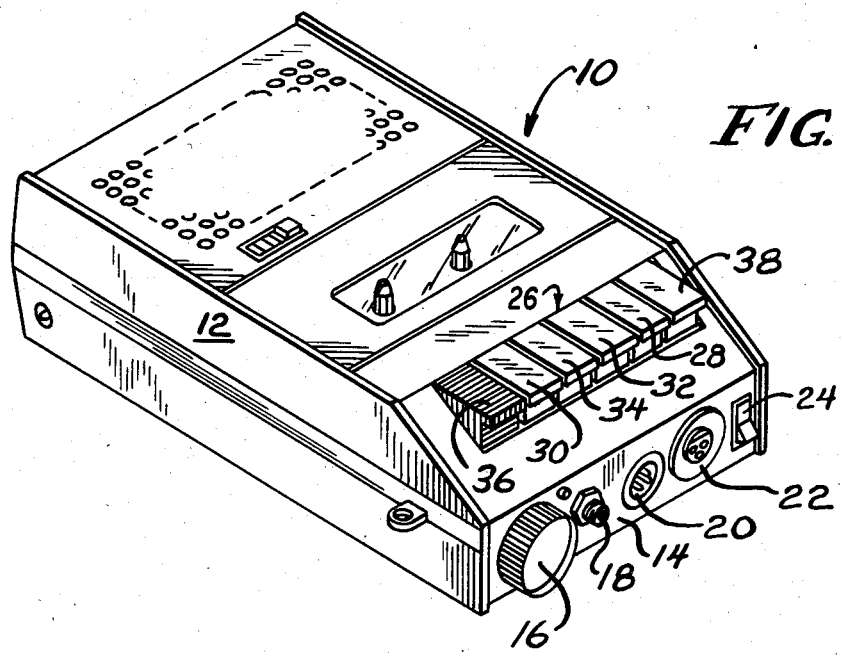

FIG. 1 is a perspective view showing the news-gathering recorder 10 of the present invention. Recorder 10 resembles many conventional cassette machines but includes a rugged all-metal body 12 for increased durability. In addition, the metalized construction serves as electro-magnetic shielding thereby minimizing radio frequency (RF) interference. All input and output connections, switches and operating controls, have been arranged on the front 14 of the recorder to facilitate ready access thereto when the recorder is carried in a canvas bag (not shown) or otherwise over the reporter's shoulder.

Positioned on the front of recorder 10 are an output level control 16, an output headphone jack 18, an output connector 20 suitable for direct interconnection to a telephone handset, an input connector 22 adapted to receive a microphone or other audio input source, and an input source selector switch 24. A set of tape transport actuator buttons 26 are similarly accessible from the front region of recorder 10. Included among these actuators are conventional stop/eject 28, play 30, fast forward 32 and rewind 34 function buttons. The record mode, however, is engaged by depressing a single record function button 36 which is mechanically linked to the play key 30, to provide "one-push" recording. This single button record operation of the present recorder has been found to provide more convenient and dependable record operation as compared with conventional 2-button record mode arrangements.

The pause function, selected by button 38, provides substantially instantaneous standby-to-play mode switching thereby permitting tight "queing" of recorded news stories without objectionable start-up speed variations. In addition, the pause function button 38 controls the talk-over feature and speaker muting of the present invention. Specifically, when the pause mode is selected, the microphone or other audio source connected to input jack 22 is routed through the bypass preamp, discussed below, through the playback amplifier circuitry and, in turn, to output jack 20 for direct connection to a telephone handset. Further, the pause mode mutes the speaker audio to eliminate the possible generation of a hollow ring or squeal caused by acoustic feedback from the recorder speaker to the microphone connected at input 22. Side tone capability, wherein the reporter may listen to his own voice as he is speaking into the microphone, is provided either through headphone jack 18 or through the telephone handset ear piece when connection is made to output jack 20. This feature is extremely useful in high noise environments wherein it is difficult to speak in a normal conversational tone unless such side tone audio is provided.

A single output level control 16 is provided for external adjustment permitting the reporter to properly regulate the audio level for transmission over telephone circuitry. The relative amplitudes of the live microphone audio during "talk over" operation and the recorded audio from the tape transport are internally matched for substantially equal output level. Both audio sources are simultaneously adjusted by playback level control 16. A record level control has been omitted for simplicity of operation. Moreover, such a control is not deemed necessary by reason of the automatic level control (ALC) circuitry which functions automatically to regulate the wide range of input audio levels to a substantially constant output or record level. Similarly, record or playback tone controls have been omitted for simplicity of operation. Internal frequency compensation circuitry provides a fixed frequency response between approximately 200 Hz and 7,000 Hz. As discussed above, this frequency range passes substantially all frequencies associated with the human voice while blocking objectionable high frequency tape hiss and low frequency hum and rumble.

Figure 2:
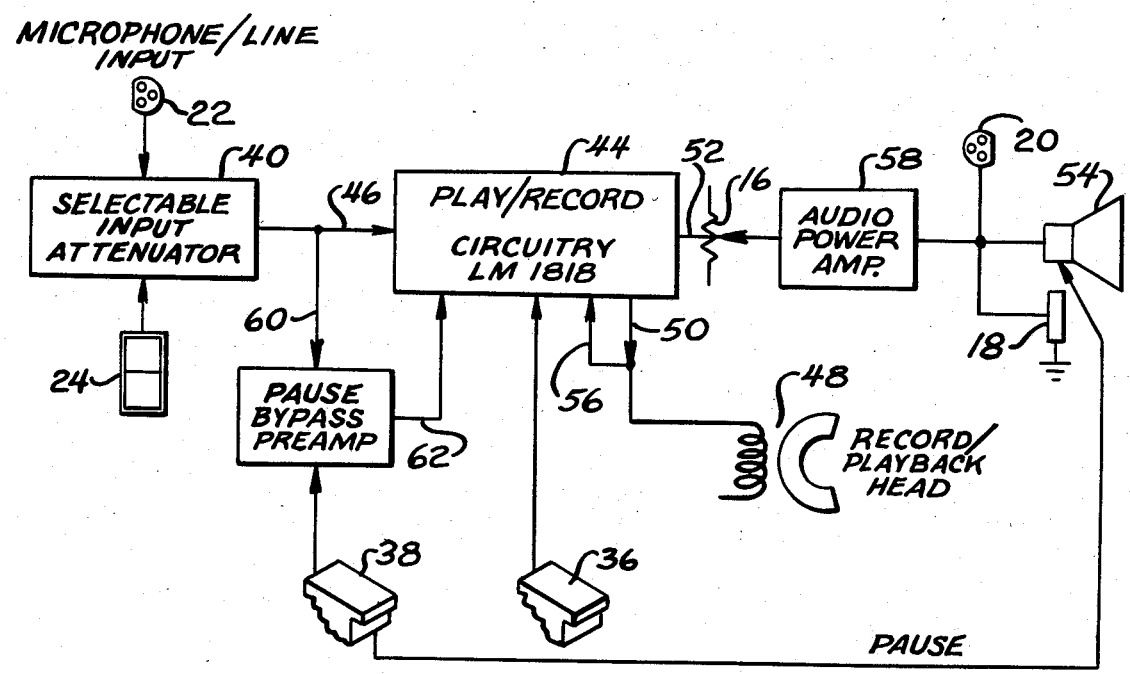

FIG. 2 is a block representation of the record, playback, and "talk-over" signal processing of the present invention. The signal from the microphone or line input, at connector 22, is routed through a selectable input attenuator 40 controlled by front panel mounted switch 24. Attenuator 40 is a conventional resistor pad arrangement providing approximately 45 db attenuation for input signals when the 'Line-in' position of switch 24 is selected. By contrast, input signals are passed substantially unattenuated to the play/record circuitry when input switch 24 is in the 'Mic' position.

The audio signal output from attenuator 40 is connected to the inputs of the pause bypass preamp 42 and the play/record circuitry 44. The pause bypass preamp 43 facilitates the "talk-over" capability of the present invention and is discussed in more detail below. Play/record circuitry 44 may comprise conventional tape recorder control and preamplifier circuitry, for example, a National LM 1818 integrated circuit has been found satisfactory. When record button 36 is depressed, internal record/playback logic routes the input signal, line 46, to the record/playback head 48, via output line 50. Record preamplifiers internal to the LM 1818 boost the low level microphone or attenuated line input signal to the required level for modulation of the record head 48. These preamps are comprised of several individual preamp sections having separate input and output connections facilitating the placement of frequency shaping filter sections therebetween. A conventional single-pole RC low pass filter is positioned between the record preamplifier sections to provide the desired filtering of hum and rumble below approximately 200 Hz. In the record mode, the playback audio is internally gated 'off' blocking the microphone audio from reaching the speaker 54, headphone output 18, or output connector 20.

In the play mode, record button 36 is automatically disengaged thereby switching the play/record circuitry 44 (LM 1818) into the play mode. In this mode the microphone input 46 is gated 'off' while the playback signal from record/playback head 48, at input 56, is amplified and fed to output 52, passed through output level control 16 and power amplifier 58, then, in turn, to the speaker 54, headphones 18, and/or telephone line through jack 20. Again a series of individual preamplifiers are provided in the LM 1818 integrated circuit to boost the relatively low level playback signal from head 48 to the level sufficient to drive power amplifier 58. Conventional RC filter sections are provided to secure the desired playback frequency response.

It will be appreciated that conventional play/record circuitry, such as the National Semiconductor LM 1818 described above, isolate the microphone input 46 during playback so that microphone audio is not passed to output 52 and to the various output devices connected to the audio power amplifier 58. This results from the fact that available play/record integrated circuits have been developed for conventional use wherein the microphone is operatively connected only with the record head and only during the record mode. Conventional recorders and play/record circuits do not comprehend the interconnection of the microphone input with the audio power output and, in fact, are specifically designed to preclude this possibility to eliminate feedback and other microphone interference to the playback program material.

Conventional cassette recorders generally do not provide an audio output suitable for direct telephone connection. A further and important deficiency of conventional recorders is the absence of means facilitating the operative connection of the recorder microphone to the telephone line wherein the news reporter may introduce or wrap-up a recorded news segment by live commentary or converse with newsroom personnel using the recorder connected microphone. This limitation associated with conventional recording machines is further aggravated by the fact that direct connection to telephone circuitry is generally made through the handset mouthpiece which generally must be removed for tape recorder connection. Thus, absent the "talk-over" capability of the instant invention, a newsman must continuously swap back and forth between the handset mouthpiece and the recorder output. This clearly precludes the traditional and common practice of "wrapping around" a recorded news segment wherein the news reporter supplements the recorded news story with his own introduction and commentary.

Referring again to FIG. 2, a pause bypass preamplifier 42 is included for use with conventional play/record circuitry to facilitate the connection of the amplified mic input signal directly to the telephone circuits through output connector 20. Specifically, it has been found desirable to effect such a connection with the recorder in the play/pause mode wherein the recorder is in the play mode with actual playing of the recorded cassette being temporarily halted or "paused" by the concurrent actuation of the pause button 38. Pause interrupted play and record functions are common to cassette recording equipment and facilitate the substantially instantaneous transition between the halted and record or playback modes. This function is particularly useful as applied in the instant news-gathering recorder in that a recorded news segment may be tightly cued for imminent and instantaneous playback while the recorder microphone is connected to the phone line for live reporter commentary.

In the play/pause mode, the microphone or line input at 60 is amplified by the pause bypass preamp 42 and returned on line 62 to the playback preamplifier circuitry for further amplification and, in turn, to the integrated circuit output 52. The point of connection of preamp output 62 to the playback amplifier circuitry follows the mic isolation gating function. Thus, the bypass preamp 42 effectively bridges the mic isolation function of a conventional play/record circuit thereby facilitating the operative interconnection of the recorder microphone to the telephone as required in a news-gathering recorder.

When the pause button is released, thus commencing actual playback of the pre-recorded tape segment, the pause bypass preamp 42 is switched off thereby again isolating the microphone input from the audio output, including speaker 54 and headphone and telephone jacks, 18 and 20. It will be appreciated that recorder 10 functions in a conventional manner when in playback but is switched to the "talk-over" mode upon actuation of the pause button.

To eliminate any possibility of signal quality degradation or feedback due to the proximity of the recorder speaker 54 and microphone during "talk-over" operation, the pause function serves to simultaneously mute speaker 54 output. This was accomplished in the present invention by providing an additional speaker ground return contact through the pause switch wherein depressing of the pause switch opens the speaker ground return contact. Any other convenient means are contemplated by this invention.

Operation of the news-gathering recorder 10 commences with the reporter depressing record button 36 and interviewing the appropriate news personality. Thereafter, the reporter rewinds and cues the tape cassette to the beginning of the recorded interview, patches the recorder output jack 20 into a telephone handset by removing the mouthpiece, and places the recorder 10 in the play/pause mode by simultaneously depressing the play and pause buttons 30 and 38, respectively. After telephoning the appropriate broadcast newsroom, the reporter may communicate directly with station personnel by speaking into the news-gathering recorder microphone and listening on the telephone earpiece or separate headset. When the news reporter receives a signal from the newsroom to commence his story, he merely speaks into the same recorder microphone thereby feeding his voice directly over the telephone circuits to the radio or television station. Upon completing his 'live' introduction to the news story, the reporter simply releases the pause button instantaneously commencing playback of the previously cued pre-recorded tape segment.

Release of the pause button simultaneously opens the microphone input connection through bypass preamp 42 and enables the output speaker 54. The reporter may then monitor the playback of his pre-recorded news segment through speaker 54, headphones connected to jack 18, or the telephone handset and continue his live narrative or wrap-up following completion of the taped segment simply by again depressing the pause button 38. As speaker 54, only, is muted in the pause "talk-over" mode, the reporter may utilize either the recorder headphone output 18 or the telephone headset as a 'side tone' to monitor his own speech. This is particularly desirable in high noise environments.

It will be appreciated that the instant news-gathering tape machine incorporates unique mechanical and electrical features specially adapted for news reporter and for field news-gathering use. To this end a sturdy all-metal, shielded recorder unit having front mounted input and output connectors and controls has been described. Unnecessary frills and features, such as input level and tone controls, have been eliminated for ease of recorder operation. In addition, the conventional two-button record arrangement has been replaced with a single convenient record access button and an instantaneous pause button is provided which functions additionally to control the "talk-over" and speaker muting features of the present invention. Importantly, an output jack adapted for direct connection to a telephone handset is provided wherein microphone or other audio inputs may be directly routed through a unique pause bypass preamplifier. In this manner, a news reporter can quickly and efficiently transition between pre-recorded news segments and live news reporter wrap-around segments for live over-the-air broadcast without the necessity of intermediate broadcast station editing or dubbing. The instant news-gathering machine, therefore, may be used for news-gathering and news reporting in a manner heretofore unavailable with known lightweight portable cassette tape apparatus.

What is claimed is:

1. In a portable battery-operated tape recorder for news-gathering and reporting or the like having a tape transport; tape recorder control means including means for selecting a record mode; a playback mode, and a pause mode; an audio input connection operatively connected to a record amplifier means including record tape head means when the record mode is selected, playback audio output means operatively connected to a playback amplifier means including playback tape head means when the play mode is selected; the improvement comprising selectable means for operatively interconnecting the audio input connection and the audio output means when the tape recorder is in the play mode whereby audio may be routed to the output means from the input connection; wherein the selectable means for operatively interconnecting the input connection and output connection includes means operatively connected to the pause mode selecting means wherein said interconnecting means is enabled only in the pause mode.

2. The portable news-gathering tape recorder of claim 1 wherein the audio output means includes a speaker and including speaker mute means operatively connected to the pause mode selecting means whereby the speaker means is disabled during the pause mode to preclude acoustic microphone response to the speaker audio output.

* * * * *